United States Patent [19]

Lee

[11] Patent Number: 5,927,098

[45] Date of Patent: Jul. 27, 1999

[54] ICE-CREAM MACHINE

[75] Inventor: Jang-Hee Lee, Seoul, Rep. of Korea

[73] Assignee: Daewoo Electronics Co., Ltd., Seoul, Rep. of Korea

[21] Appl. No.: 08/986,230

[22] Filed: Dec. 5, 1997

[30]    Foreign Application Priority Data

Dec. 27, 1996 [KR]   Rep. of Korea ...................... 96-73825

[51] Int. Cl.$^6$ .................................................. A23G 9/16
[52] U.S. Cl. ............................................... 62/342; 62/524
[58] Field of Search .............................. 62/342, 343, 199, 62/200, 519, 524, 525

[56]              References Cited

U.S. PATENT DOCUMENTS

| | | | |
|---|---|---|---|
| 4,538,427 | 9/1985 | Cavalli | 62/342 |
| 4,573,329 | 3/1986 | Cavalli | 62/342 |
| 4,583,863 | 4/1986 | Pandolfi | 366/149 |

*Primary Examiner*—William E. Tapolcai
*Attorney, Agent, or Firm*—Pillsbury Madison & Sutro LLP

[57]                ABSTRACT

A household ice-cream machine comprises a mixing blade driven and rotated by a motor for mixing material for ice-cream in a cylindrical container. A pair of holding members are disposed to be in contact with an outer surface of the cylindrical container. Each of the pair of holding members is formed in an arch shape. Each of the pair of holding members has projections formed on and bent from one end of each of the pair of holding members. The fastened projections are oppositely disposed and connected to each other by a pair of fastening members. Each of a pair of cooling members is formed in an arch shape and has an evaporating pipe integrally formed therein. Each of the pair of cooling members is disposed to be in contact with an outer surface of each of the pair of holding members.

10 Claims, 5 Drawing Sheets

ICE-CREAM MACHINE

BACKGROUND OF THE INVENTION

1. Field of the Invention

The present invention relates to an ice-cream machine, and particularly to an ice-cream machine having an evaporating pipe formed to closely contact an outer face of the cylindrical container.

2. Description of the Prior Art

In general, an ice-cream machine mixes material for ice-cream in a container by a mixing blade and cools the mixed material by a cooling apparatus disposed therein on the outer surface of the container, so that the ice-cream is made.

U.S. Pat. No. 4,583,863(issued to Alberto Pandolfi on Apr. 22, 1986) discloses a household ice-cream machine having an annular container 5 within which there is a mixing blade driven by a motor. FIG. 1 is a partially and schematically cross-sectioned view of a household ice-cream machine according to a first conventional household ice-cream machine. FIG. 2 is a partially and schematically cross-sectioned view of a household ice-cream machine according to a second conventional ice-cream machine. As shown in FIGS. 1 and 2, the annular container 5 is detachably supported within an annular vessel 1 so as to define an interspace 8 between the annular container 5 and the annular vessel 1. The annular vessel 1 contains such a quantity of a low-freezing point liquid as to fill the interspace 8 when the annular container 5 is assembled within the annular vessel 1. An evaporator 9 is disposed in a favorable heat exchange relationship with the liquid in the interspace 8. According to the first conventional household ice-cream machine, the evaporator 9 is housed within the interspace 8 so as to be immersed in the low-freezing point liquid when the annular container 5 is assembled in the annular vessel 1. The function of the low-freezing point liquid in the interspace 8 is to ensure good cold transmission from the evaporator 9 to the annular container 5. According to the second conventional household ice-cream machine, the annular vessel 1 is of material with a high thermal conductivity and the evaporator 9 is welded to the outer surface of the outer surface wall and the bottom of the annular vessel 1. Thus, the evaporator 9 is no longer immersed in the low-freezing point liquid, which further simplifies the periodic cleaning of the annular container 5. Moreover, the evaporator coil 9, even when the annular container 5 is removed, is protected and screened by the annular vessel and is invisible from the exterior.

However, the conventional ice-cream machines have a low heat-exchanging efficiency between the evaporator 9 and the annular container 5 because the evaporator 9 maintains a certain distance from the annular container 5. Also, the first conventional ice-cream machine has the evaporator 9 as like an evaporating pipe wound many times around an inner side of the annular vessel 1. Further, the second conventional ice-cream machine has the evaporator 9 as like an evaporating pipe wound many times around an outer surface of the annular vessel 1. The evaporating pipe must be wound with equal distance between each circumnavigates. Also, when the evaporating pipe is wound around the outer surface of the container, the evaporating pipe and the container are disposed under the condition of point contact. Thus, heat-exchange is not generated promptly.

SUMMARY OF THE INVENTION

Therefore, it is an object of the present invention to provide a household ice-cream machine having a cooling apparatus that has direct contact with a container for improving transmission efficiency of cool air.

It is another object of the present invention to provide a household ice-cream machine having a cooling apparatus capable of being easily assembled with the container.

To achieve the above objects, a household ice-cream machine comprises a cylindrical container, a pair of cooling members, a compressor, a pair of holding members, and a condenser. The cylindrical container has a rotating shaft to be rotated by a motor and at least one mixing blade disposed around the rotating shaft. Each of the pair of holding members is formed in an arch shape and disposed to be in contact with an outer surface of the container. Each of the pair of cooling members is formed in an arch shape, disposed to be in contact with an outer surface of each of the pair of holding members and has an evaporating pipe. The compressor increases temperature and pressure of gaseous refrigerant flowed from the pair of cooling members and then reverts the gaseous refrigerant into liquid refrigerant. Further, the condenser is installed in a position between the compressor and the pair of cooling members and provides the refrigerant to the pair of cooling members. Each of the pair of holding members (called hereinafter "one holding member") comprises projections each of which is integrally formed on one end of one holding member and bent from one end of one holding member. The projections are oppositely disposed and connected to each other by a pair of fastening members. A first link member is disposed between refrigerant exits of the pair of cooling members and the compressor for providing the refrigerant received from the pair of cooling members into the compressor. The first link member comprises a pair of inflow openings formed in one side thereof to be connected to the refrigerant exit of each of the pair of cooling members and an exflow opening continued with the pair of the inflow openings and connected to the compressor. A second link member is disposed between refrigerant entrances of the pair of cooling members and the condenser for providing the refrigerant into the pair of cooling members. The second link member comprises an inflow opening formed in one side thereof to be connected to the condenser and a pair of exflow openings continued with the inflow opening thereof and connected to the refrigerant entrance of each of the pair of cooling members, respectively. Each of said pair of cooling members has a flat face for contacting the outer surface of each of the pair of holding members and a corrugated face having a prominence and depression due to the evaporating pipe therein.

In the household ice-cream machine according to the present invention, the first advantage is to improve a cooling effect due to the increment of the size of heat exchanging between the cylindrical container and the evaporating pipe. Second, the pair of cooling members are easier to manufacture and assemble because the pair of cooling members are formed in the plate having the evaporating pipe. Third, the pair of holding members are disposed between the pair of cooling members and the cylindrical container and thus prevent the evaporating pipe from damage although the cylindrical container is detached from the household ice-cream machine. Fourth, the pair of holding members compensate the household ice-cream machine for damage due to a size difference of the cylindrical container and the pair of cooling members when the cylindrical container is assembled in the household ice-cream machine.

BRIEF DESCRIPTION OF THE DRAWINGS

The above objects and other advantages of the present invention will become more apparent by describing in detail the preferred embodiment thereof with reference to the attached drawings in which.

DETAILED DESCRIPTION OF THE PREFERRED EMBODIMENTS

Embodiments of the present invention now will be described below with reference to FIG. 3 through FIG. 5.

Figure 1:
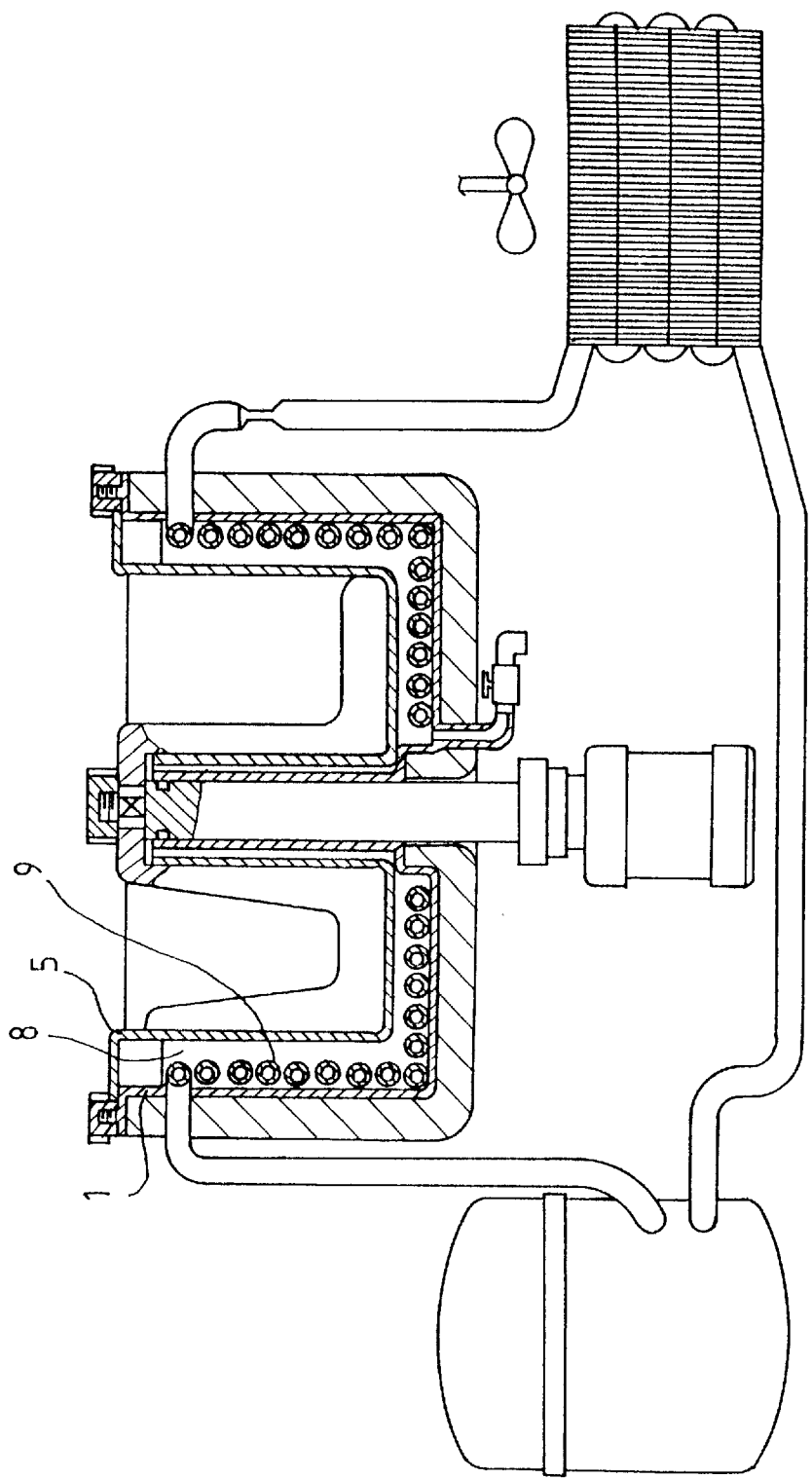
FIG. 1 is a partially and schematically cross-sectioned view of a household ice-cream machine according to a first conventional ice-cream machine.
Figure 2:
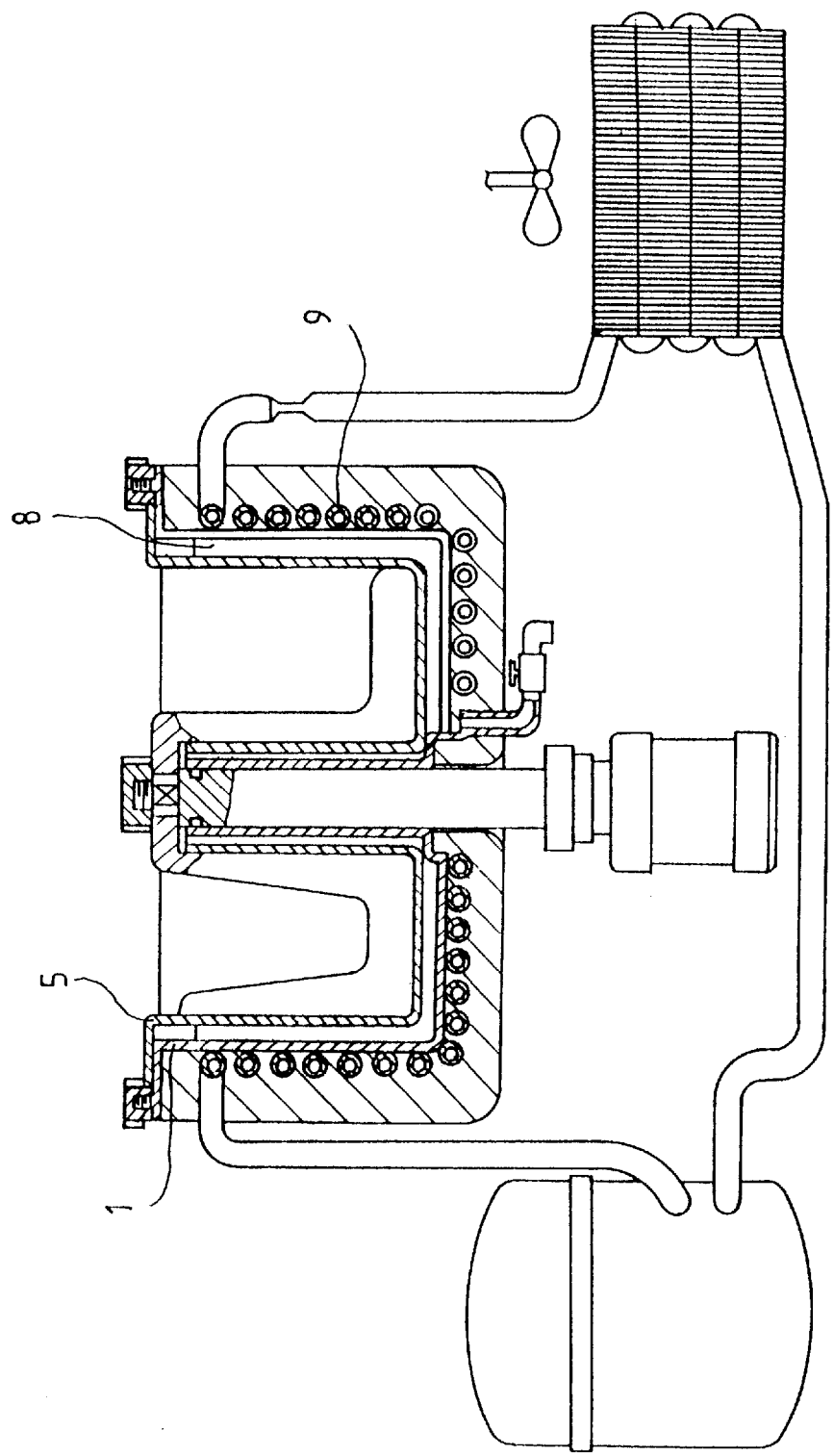
FIG. 2 is a partially and schematically cross-sectioned view of a household ice-cream machine according to a second conventional ice-cream machine.
Figure 3:
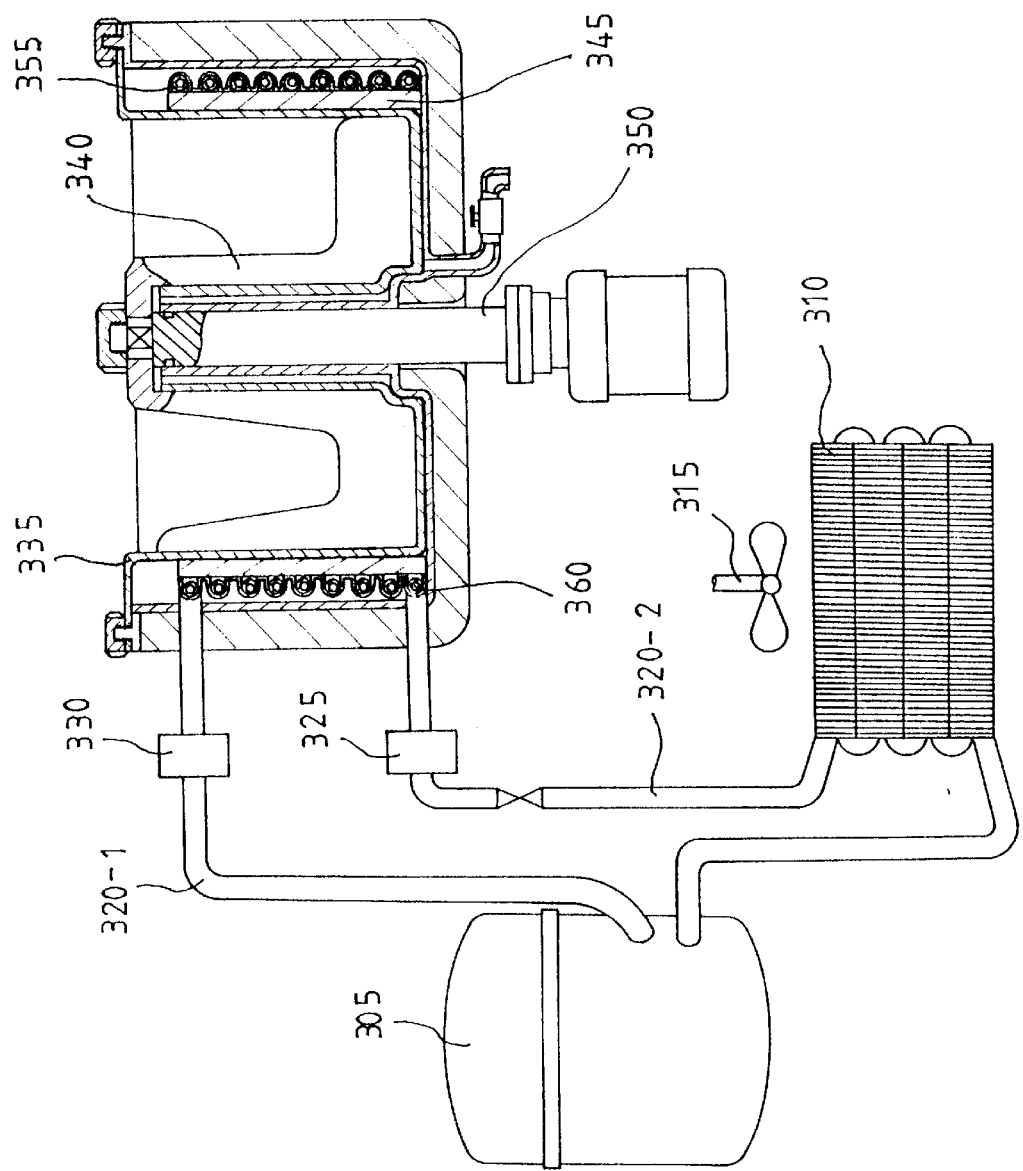
FIG. 3 is a partially and schematically cross-sectioned view of a household ice-cream machine according to the present invention.
Figure 4:
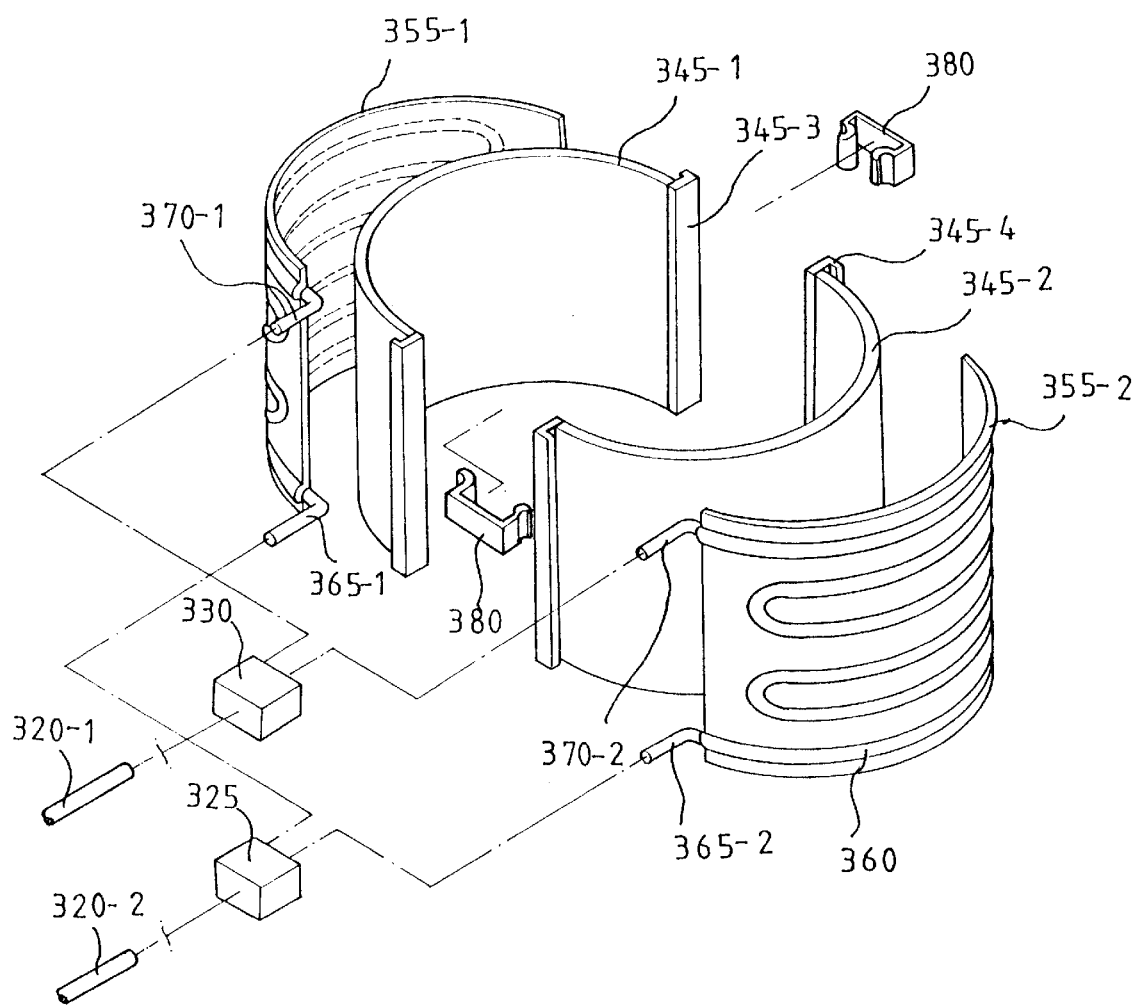
FIG. 4 is an exploded perspective view of a pair of cooling members and a pair of holding members of the household ice-cream machine according to the present invention.

FIG. 3 is a partially and schematically cross-sectioned view of a household ice-cream machine according to the present invention. FIG. 4 is an exploded perspective view of a pair of cooling members and a pair of holding members in the household ice-cream machine according to the present invention. FIG. 5 is a partially and schematically cross-sectioned view of the household ice-cream machine according to the present invention.

A rotating shaft 350 is received in the center of the inside of a cylindrical container 335 and is rotated by a motor. A mixing blade 340 is disposed around the rotating shaft 350. A function of the mixing blade 340 is to mix material for ice-cream in the cylindrical container 335. A pair of holding members each formed in an arch shape 345-1, 345-2 are disposed to be in contact with an outer surface of the cylindrical container 335. The pair of holding members 345-1, 345-2 are made of high thermal conductive material. A pair of cooling members each formed in an arch shape 355-1, 355-2 are disposed to be in contact with outer surfaces of the pair of holding members 345-1, 345-2. Each of the pair of cooling members 355-1, 355-2 comprises an evaporating pipe 360 flowing the refrigerant through it. In this embodiment, each of said pair of cooling members has a flat face and a corrugated face. The flat face has contact with the outer surface of each of the pair of holding members 345-1, 345-2. The corrugated face has a prominence and depression due to the evaporating pipe therein.

Therefore, each of the pair of cooling members 355-1, 355-2 is formed in the arch shape plate having the evaporating pipe 360 therein. The evaporating pipes 360 have refrigerant exits 370-1, 370-2 and refrigerant entrances 365-1, 365-2. The refrigerant exits 370-1, 370-2 of the evaporating pipes 360 of the pair of cooling members 355-1, 355-2 are linked with a first refrigerant passage 320-1 connected with the compressor 305 through a first link member 330 to flow the gaseous refrigerant from the pair of cooling members 355-1, 355-2 into the compressor 305. The pair of refrigerant entrances 365-1, 365-2 are linked with a second refrigerant passage 320-2 connected with the condenser 310 through a second link member 325 to flow the refrigerant from the condenser 310 into the pair of cooling members 355-1, 355-2. The condenser 310 and the compressor 305 are linked by a third refrigerant passage. Refrigerant which has attained high temperature and pressure by the compressor 305 feeds into the condenser 310 and further passes a capillary pipe, so that the high pressure and temperature refrigerant reverts to a low temperature and pressure refrigerent by a fan 315.

The pair of holding members are a first holding member 345-1 and a second holding member 345-2. Each of the pair of holding members has projections each of which is integrally formed on one end of holding member. The first holding member 345-1 has a pair of first projections 345-3, and the second holding member 345-2 has a pair of second projections 345-4. The first projections 345-3 of the first holding member 345-1 are faced with and connected to the second projections 345-4 of the second holding member 345-2, so that the pair of holding members 345-1, 345-2 shield the cylindrical container 335 with their body. The first and second holding members 345-1, 345-2 are assembled in cylindrical form by a pair of fastening members 380. The refrigerant entrances 365-1, 365-2 of the pair of cooling members 355-1, 355-2 are connected with the second refrigerant passage 320-2 assembled with the condenser 310 through the second link member 325. The refrigerant exits 370-1, 370-2 of the pair of cooling members 355-1, 355-2 are connected with the first refrigerant passage 320-1 assembled with the compressor 305 through the first link member 330.

Figure 5:
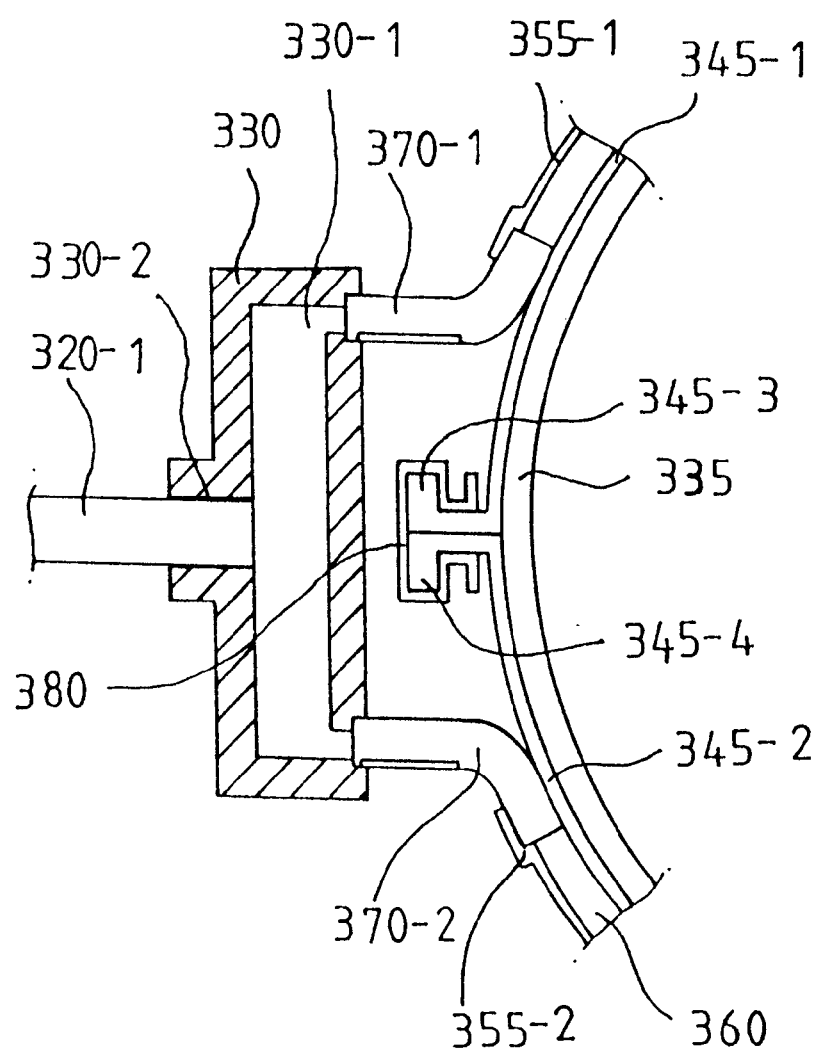
FIG. 5 is a partially and schematically cross-sectioned view of the household ice-cream machine according to the present invention.

FIG. 5 shows a connecting relation of the first refrigerant passage 320-1, the first link member 330, and the refrigerant exits 370-1, 370-2 of the evaporating pipes 360 and an assembling relation between the pair of holding members 345-1, 345-2 and the pair of fastening members 380. The first and second projections 345-3, 345-4 of the pair of holding members 345-1, 345-2 are faced with each other. The pair of holding members 345-1, 345-2 are assembled in the cylinder shape by the pair of fastening members 380. Further, the pair of holding members 345-1, 345-2 are very closely attached to the outer surface of the cylindrical container 335 by the fastening members 380. The first link member 330 is disposed between a pair of refrigerant exits 370-1, 370-2 of the pair of cooling members 355-1, 355-2 and the compressor 305. The first link member 330 has a pair of inflow openings 330-1 formed in one side thereof and an exflow opening continued with the pair of inflow openings 330-1 and connected to the compressor 305. The pair of inflow openings 330-1 are connected to the refrigerant exit of each of the pair of cooling members. The first link member 330 receives the gaseous refrigerant from the evaporating pipe 360, and the gaseous refrigerant flows through the first passage 320-1 into the compressor 305. The second link member 325 as shown in FIG. 4 equals to the first link member 330 in its shape. The second link member 325 is a passage that refrigerant flows from the condenser 310 into the pair of cooling members 355-1, 355-2. The second link member 325 is disposed between the refrigerant entrances of the pair of cooling members 355-1, 355-2 and the condenser 310. The second link member 325 has an inflow opening formed in one side of thereof and the pair of exflow openings continued with the inflow opening thereof. The inflow opening is connected to the condenser 310. The pair of exflow openings are connected to the refrigerant entrances of the pair of cooling members 355-1, 355-2, respectively.

The operation and effects of the household ice-cream machine according to the present invention having the construction as described above will be described below.

When the power source is on in the household ice-cream machine, the mixing blade 340 received in the cylindrical container 335 rotates toward the predetermined direction depending on the rotation of the rotating shaft 350 driven by the motor(not shown in the figures). The material for ice-cream in the cylindrical container 335 are mixed by the rotation of the mixing blade 340. At the same time, the temperature and pressure of the refrigerant are increased by the compressor 305. The refrigerant flows into the third refrigerant passage of the condenser 310 and further passes the capillary pipe of the condenser 310. The temperature of refrigerant is decreased by the fan 315. Thus, the gaseous refrigerant converts to the fluid refrigerant when the refrigerant passes through the capillary pipe. The fluid refrigerant is provided to the refrigerant entrances 365-1, 365-2 of the evaporating pipes 360 through the second link member 325. The fluid refrigerant flows through the evaporating pipes 360 and absorbs heat from the circumference. Therefore, the fluid refrigerant converts to the gaseous refrigerant. And, the pair of holding members 345-1, 345-2 become cool by the gaseous refrigerant, and thus the cylindrical container 335 become cool due to the face contact with the pair of holding members 345-1, 345-2. When the cylindrical container 335 become cool, the material for ice-cream mixed by the mixing blade 340 turns to ice-cream. The gaseous refrigerant passing through the evaporating pipes 360 flows into the compressor 305 through the first link member 330. The temperature and pressure of the gaseous refrigerant are increased by the compressor 305. Therefore, the gaseous refrigerant converts to the fluid refrigerant by circulating back to the compressor 305.

In the household ice-cream machine according to the present invention, the first advantage is to improve a cooling effect due to the increment of the heat exchanging size between the cylindrical container and the evaporating pipes. Second, the pair of cooling members are easier to manufacture and assemble because the pair of cooling members are formed in the plate having the evaporating pipes. Third, the pair of holding members are disposed between the pair of cooling members and the cylindrical container and thus prevents the evaporating pipe from being damaged when the cylindrical container is released from the household ice-cream machine. Fourth, the pair of holding members prevent the household ice-cream machine for being damaged due to a size difference of the cylindrical container and the pair of cooling members when the cylindrical container is assembled in the household ice-cream machine.

In the above, the present invention is described in detail by using the preferred embodiment, but the invention is not limited in the above embodiment. It should be obvious to people skilled in the conventional art that modifications can be made to the invention as described above without departing from the spirit or the scope of the invention. However the invention is limited by accompanying claims as below.

What is claimed is:

1. A household ice-cream machine comprising:
   a cylindrical container for containing material for ice cream and for receiving a rotating shaft to be rotated by a motor and at least one mixing blade disposed on the rotating shaft;
   a pair of holding members each formed in an arch shape, disposed to be in contact with an outer surface of the cylindrical container, and connected with each other by a pair of fastening members;
   a pair of cooling members each formed in an arch shape, each having an evaporating pipe integrally formed therein, and disposed to be in contact with outer surfaces of the pair of holding members;
   a compressor for increasing temperature and pressure of gaseous refrigerant flowed from the pair of cooling members, and for reverting the gaseous refrigerant into liquid refrigerant; and
   a condenser installed in a position between the compressor and the pair of cooling members, and for providing the refrigerant to the pair of cooling members.

2. The household ice-cream machine as claimed in claim 1, wherein each of said pair of holding members comprises projections each of which is integrally formed on and bent from one end of each of the pair of holding members.

3. The household ice-cream machine as claimed in claim 2, wherein said projections are oppositely disposed and connected to each other by the pair of fastening members.

4. The household ice-cream machine as claimed in claim 1, wherein each of said pair of cooling members comprises:
   a refrigerant entrance for providing the refrigerant from the condenser to each of the pair of cooling members; and
   a refrigerant exit for flowing the refrigerant from the each of the pair of the cooling members into the compressor.

5. The household ice-cream machine as claimed in claim 4, wherein a first link member is further disposed between the refrigerant exit of each the pair of cooling members and the compressor and for providing the refrigerant received from the pair of cooling members into the compressor.

6. The household ice-cream machine as claimed in claim 5, wherein said first link member comprises:
   a pair of inflow openings formed in one side thereof to be connected to the refrigerant exit of each of the pair of cooling members; and
   an exflow opening continued with the pair of inflow openings and connected to the compressor.

7. The household ice-cream machine as claimed in claim 5, wherein a second link member is further disposed between the refrigerant entrance of each of the pair of cooling members and the condenser and provides refrigerant into the pair of cooling members, respectively.

8. The household ice-cream machine as claimed in claim 7, wherein said second link member comprises:
   an inflow opening formed in one side thereof to be connected to the condenser; and
   a pair of exflow openings continued with the inflow opening and connected to the refrigerant entrance of each of the pair of cooling members, respectively.

9. The household ice-cream machine as claimed in claim 1, wherein each of said pair of cooling members has:
   a flat face for contacting the outer surface of each of the pair of holding members; and
   a corrugated face having a prominence and depression due to the evaporating pipe therein.

10. A household ice-cream machine comprising:
    a cylindrical container for containing material for ice cream and for receiving a rotating shaft to be rotated by a motor and at least one mixing blade disposed on the rotating shaft;
    a pair of holding members each formed in an arch shape, disposed to be in contact with an outer surface of the cylindrical container, and connected with each other by a pair of fastening members,
      wherein each of the pair of holding members has projections each of which is integrally formed on and bent from one end of each of the pair of holding members,
      wherein the projections are oppositely disposed and connected to each other by a pair of fastening members;

a pair of cooling members each formed in an arch shape, each having an evaporating pipe integrally formed therein, and disposed to be in contact with outer surfaces of the pair of holding members, wherein each of the pair of cooling members has:

a flat face for contacting the outer surface of each of the pair of holding members, a corrugated face having a prominence and depression due to the evaporating pipe therein, a refrigerant entrance for providing the refrigerant from the condenser to each of the pair of cooling members, and a refrigerant exit for flowing the refrigerant from the each of the pair of the cooling members into the compressor;

a compressor for increasing temperature and pressure of gaseous refrigerant flowed from the pair of cooling members, and for reverting the gaseous refrigerant into liquid refrigerant;

a condenser installed in a position between the compressor and the pair of cooling members, and for providing the refrigerant to the pair of cooling members;

a first link member disposed between the refrigerant exit of each of the pair of cooling members and the compressor, for providing the refrigerant received from the pair of cooling members into the compressor, wherein the first link member has:

a pair of first inflow openings formed in one side thereof and connected to the refrigerant exit of each of the pair of cooling members, and a first exflow opening continued with the pair of first inflow openings and connected to the compressor; and a second link member disposed between the refrigerant entrance of each of the pair of cooling members and the condenser and for providing refrigerant into the pair of cooling members, respectively, wherein the second link member has:

an second inflow opening formed in one side thereof to be connected to the condenser, and a pair of second exflow openings continued with the second inflow opening and connected to the refrigerant entrance of each of the pair of holding members, respectively.

* * * * *